(12) United States Patent
Lethorn

(10) Patent No.: US 8,376,092 B2
(45) Date of Patent: Feb. 19, 2013

(54) PAD RETRACTION DEVICE

(75) Inventor: Brad Robert Lethorn, Northville, MI (US)

(73) Assignee: Akebono Brake Corp., Farmington Hills, MI (US)

( * ) Notice: Subject to any disclaimer, the term of this patent is extended or adjusted under 35 U.S.C. 154(b) by 150 days.

(21) Appl. No.: 13/024,357

(22) Filed: Feb. 10, 2011

(65) Prior Publication Data
US 2012/0205205 A1    Aug. 16, 2012

(51) Int. Cl.
*F16D 55/22*    (2006.01)
(52) U.S. Cl. .................................. 188/72.3; 188/73.38
(58) Field of Classification Search ................. 188/72.3, 188/73.36, 73.37, 73.38
See application file for complete search history.

(56) References Cited

U.S. PATENT DOCUMENTS

| | | | |
|---|---|---|---|
| 4,245,723 A * | 1/1981 | Moriya ...................... | 188/73.38 |
| 4,364,455 A | 12/1982 | Oshima | |
| 4,491,204 A | 1/1985 | Dirauf et al. | |
| 4,658,938 A | 4/1987 | Thiel et al. | |
| 4,666,025 A | 5/1987 | Rubin | |
| 4,969,540 A | 11/1990 | Cartwright et al. | |
| 5,069,313 A | 12/1991 | Kato et al. | |
| 5,249,647 A | 10/1993 | Kobayashi et al. | |
| 5,251,727 A | 10/1993 | Loeffler et al. | |
| 5,511,638 A | 4/1996 | Tsuruta | |
| 5,538,103 A | 7/1996 | Rueckert et al. | |
| 5,549,181 A | 8/1996 | Evans | |
| 5,699,882 A | 12/1997 | Ikegami et al. | |
| 5,901,815 A | 5/1999 | Kobayashi et al. | |
| 5,934,417 A | 8/1999 | Kobayashi et al. | |
| 5,941,348 A | 8/1999 | Matsumoto et al. | |
| 5,947,233 A | 9/1999 | Kobayashi et al. | |
| 6,003,642 A | 12/1999 | Mori et al. | |
| 6,286,636 B1 | 9/2001 | Iwata | |
| 6,378,665 B1 | 4/2002 | McCormick | |
| 6,378,666 B1 | 4/2002 | Yoko | |
| 6,478,122 B1 | 11/2002 | Demoise et al. | |
| 6,527,090 B1 | 3/2003 | Barillot et al. | |
| D473,127 S | 4/2003 | Yoko | |
| D483,709 S | 12/2003 | Byrd | |
| 6,678,666 B1 | 1/2004 | Boulware | |
| 6,719,105 B1 | 4/2004 | Wemple | |
| D489,655 S | 5/2004 | Byrd | |

(Continued)

FOREIGN PATENT DOCUMENTS

| | | |
|---|---|---|
| EP | 2299142 A1 | 3/2011 |
| GB | 2172068 A | 9/1986 |

(Continued)

OTHER PUBLICATIONS

Co-pending U.S. Appl. No. 12/788,806, dated May 27, 2010.

(Continued)

*Primary Examiner* — Thomas J Williams
(74) *Attorney, Agent, or Firm* — Dobrusin & Thennisch PC

(57) ABSTRACT

A device comprising: a pair of opposing legs; a bridge between and connecting the pair of legs; a pair of retraction spring arms attached to the outside of each of the legs; the retraction spring arms each comprising: a guide support tab connected to each of the pair of opposing legs wherein the retraction spring arms assist in retracting a pair of brake pads, and the guide support tabs guide the retraction spring arms during movement.

24 Claims, 4 Drawing Sheets

U.S. PATENT DOCUMENTS

| | | |
|---|---|---|
| 6,920,965 B2 | 7/2005 | Burgdorf et al. |
| 6,959,792 B2 | 11/2005 | Ashman et al. |
| 7,163,089 B2 | 1/2007 | Nogiwa |
| 7,219,773 B2 * | 5/2007 | Ono ............................ 188/73.38 |
| 7,308,974 B2 | 12/2007 | Barbosa |
| 7,455,153 B2 | 11/2008 | Ooshima et al. |
| 7,467,693 B2 | 12/2008 | Barbosa |
| 7,513,340 B2 | 4/2009 | Hendrich et al. |
| 7,644,809 B2 | 1/2010 | Cortinovis et al. |
| 7,766,131 B2 * | 8/2010 | Hayashi ..................... 188/73.38 |
| 8,020,674 B2 | 9/2011 | Miura et al. |
| 2002/0189911 A1 | 12/2002 | Layton |
| 2006/0037821 A1 | 2/2006 | Barbosa et al. |
| 2006/0070828 A1 | 4/2006 | Hendrich et al. |
| 2007/0029148 A1 | 2/2007 | Jedele |
| 2007/0251772 A1 | 11/2007 | Tsurumi |
| 2011/0168503 A1 * | 7/2011 | Chelaidite ................. 188/73.31 |
| 2012/0205205 A1 | 8/2012 | Lethorn |

FOREIGN PATENT DOCUMENTS

| | | | |
|---|---|---|---|
| JP | 56-21633 U | | 2/1981 |
| JP | 08-261261 A | | 10/1996 |
| JP | 08261261 A | * | 10/1996 |
| JP | 08284983 A | | 11/1996 |
| JP | 2001336554 | | 12/2001 |

OTHER PUBLICATIONS

Co-pending U.S. Appl. No. 13/011,971, dated Jan. 24, 2011.

* cited by examiner

PAD RETRACTION DEVICE

FIELD OF THE INVENTION

The present invention generally relates to a brake system and more particularly a pad clip that assists in retracting the brake pads.

BACKGROUND OF THE INVENTION

Typical, disc brake systems include a support bracket, two more brake pads, a caliper, and a rotor. The at least two brake pads are mounted and located adjacent to the support bracket so that the brake pads move axially towards and away from the rotor. The disc brake system may include a pad clip that attaches to the support bracket and to a portion of the one or more brake pads so that the brake pads are held by the support bracket. The disc brake system may include one or more springs that attach to the brake pads to assist in retracting the brake pads. However, in some instances pad clips may include arms that assist in retraction instead of adding a separate spring. The addition of one or more clips that include retraction arms may require modifications to be made to the support bracket, brake pads, caliper body, or a combination thereof so that the pad clip may be used. Examples of such pad retraction devices are disclosed in U.S. Pat. No. D483,709S and D489,655S and U.S. patent application Ser. No. 12/788, 806 all of which are expressly incorporated herein by reference for all purposes.

One disadvantage faced by pad clips that include retraction arms (hereinafter pad clip) is that the retraction arms are located in the center of the pad clip. Thus, the rotor and the retraction arms are located in the same gap, and the retraction arms may contact the rotor or vice versa potentially damaging the rotor, the pad clip, or both. For example, as the brakes are applied the brake pads and retraction arms are moved towards the rotor and the rotor gap, and the retraction arms may be moved into contact into the rotor. The retraction arms may further contact the rotor causing brake noise, vibration, harshness, or a combination thereof.

Another disadvantage is that the addition of the one or more retraction arms into the rotor gap reduces the amount of space available on either side of the rotor or requires a larger rotor gap so that the pad clip does not contact the rotor. In order to compensate for the reduction of space in the rotor gap due to the retraction arms, the support bracket may require expensive design changes so that a consistent gap may be maintained between the rotor and the pad clip/support bracket. Furthermore, due to the addition of the retraction arms into the rotor gap, thicker rotors (e.g., vented rotors) and/or offset pressure plate ears are used so that the brake pad may contact the rotor when the brake pads are in the fully worn position.

Another disadvantage faced by pad clips is that the retraction arms are staggered or offset (i.e. not located on the same plane). This may cause an unequal force to be applied on the opposing brake pads. It may also cause tying and/or tipping of the brake pads due to opposing ends of the brake pads being contacted at different locations or heights.

Yet another disadvantage faced by pad clips is that the length of the retraction arms are short due to the arms being located in the center of the pad clip. The shorter arm may produce less consistent retraction forces due to deformation, a shorter lever, less area in which to store energy, or a combination thereof. Thus, there is a need for a pad clip design that includes integral retraction arms that are not located in the rotor gap; applies a consistent force to the brake pads throughout wearing of the brake pad; a retraction arm that does not rotate and/or maintains a parallel position to the brake pad; provides for a spreader spring arm that is located between the pressure plate and the rotor without increasing the stack path of the pressure plate; or a combination thereof.

SUMMARY OF THE INVENTION

One possible embodiment of the present invention includes: a device comprising: a pair of opposing legs; a bridge between and connecting the pair of legs; a pair of retraction spring arms attached to the outside of each of the legs; the retraction spring arms each comprising: a guide support tab connected to each of the pair of opposing legs wherein the retraction spring arms assist in retracting a pair of brake pads, and the guide support tabs guide the retraction spring arms during movement.

Another possible embodiment of the present invention includes: a method comprising: contacting a pair of brake pads with a pad retraction device, wherein the pad retraction device comprises: a pair of opposing legs; a bridge between and connecting the pair of legs; a pair of retraction spring arms attached to the outside of each of the legs; the retraction spring arms each comprising: a guide support tab connected to each of the pair of opposing legs wherein the retraction spring arms assist in retracting a pair of brake pads, and the guide support tabs guide the retraction spring arms during movement.

Yet another possible embodiment of the present invention includes: a method of preventing drag comprising: contacting a pair of brake pads with a pad retraction device, wherein the pad retraction device comprises: a pair of opposing legs; a bridge between and connecting the pair of legs; a pair of retraction spring arms attached to the outside of each of the legs; the retraction spring arms each comprising: a guide support tab connected to each of the pair of opposing legs wherein the retraction spring arms assist in retracting a pair of brake pads, and the guide support tabs guide the retraction spring arms during movement.

One unique aspect of the present invention envisions a pad clip that includes at least two unitary retraction arms. The retraction arms are located on the outside of the pad clip so that contact with the brake rotor is minimized and preferably eliminated. The present invention will also allow for a smaller rotor gap so that virtually any rotor (i.e., thickness) may be used, and during a brake apply the pedal travel will be kept short and the brakes will not feel soft. Further, the arms are coplanar so that the force exerted axially by each arm will be substantially the same so that risk of tying and/or tipping of the brake pads is substantially reduced, eliminated, or both.

Another unique aspect of the present invention envisions a retraction arm that includes an anti-rotation device (i.e., guide support tab) so that during a brake apply, a brake retract, or both a face of the retraction arm remains substantially parallel to a face of the brake pad. Thus, the retraction spring arm will provide a consistent force to the brake pad without increasing the stack path so that the brake pad is fully retracted after each brake apply.

Another unique aspect of the present invention envisions each arm including a pull-back feature (i.e. a pull-back curve, a pull-back limb, or both) so that during a brake apply, a brake retract, brake wear, or a combination thereof the retraction arm is not moved into contact with the brake rotor. The pull-back feature further allows for a longer lever arm so that more force is applied, the force is stored in more than one region of the retraction arm, a more consistent force is applied, or a combination thereof.

Yet another unique aspect of the present invention envisions a unitary locator that enables the pad clip to be fixedly attached to the support bracket and allows for some axial movement of the entire pad clip, relative to the rotor. The locator of the present invention has some springing properties so that pad clip may move axially by a force applied to the pad clip. The springing properties allow to the pad clip to reposition itself if the pad clip is improperly attached or the pad clip is axially moved away from the desired location. Accordingly, it has been identified by the present inventor that it is important to employ a particular design for pad clips that include retraction arms so that the brake pads can be retracted and the air gap maximized without damaging the rotor, the pad clip, or both; the pad clip providing inconsistent retraction; creating noise, vibration or harshness; or a combination thereof.

DETAILED DESCRIPTION OF THE INVENTION

Figure 1:
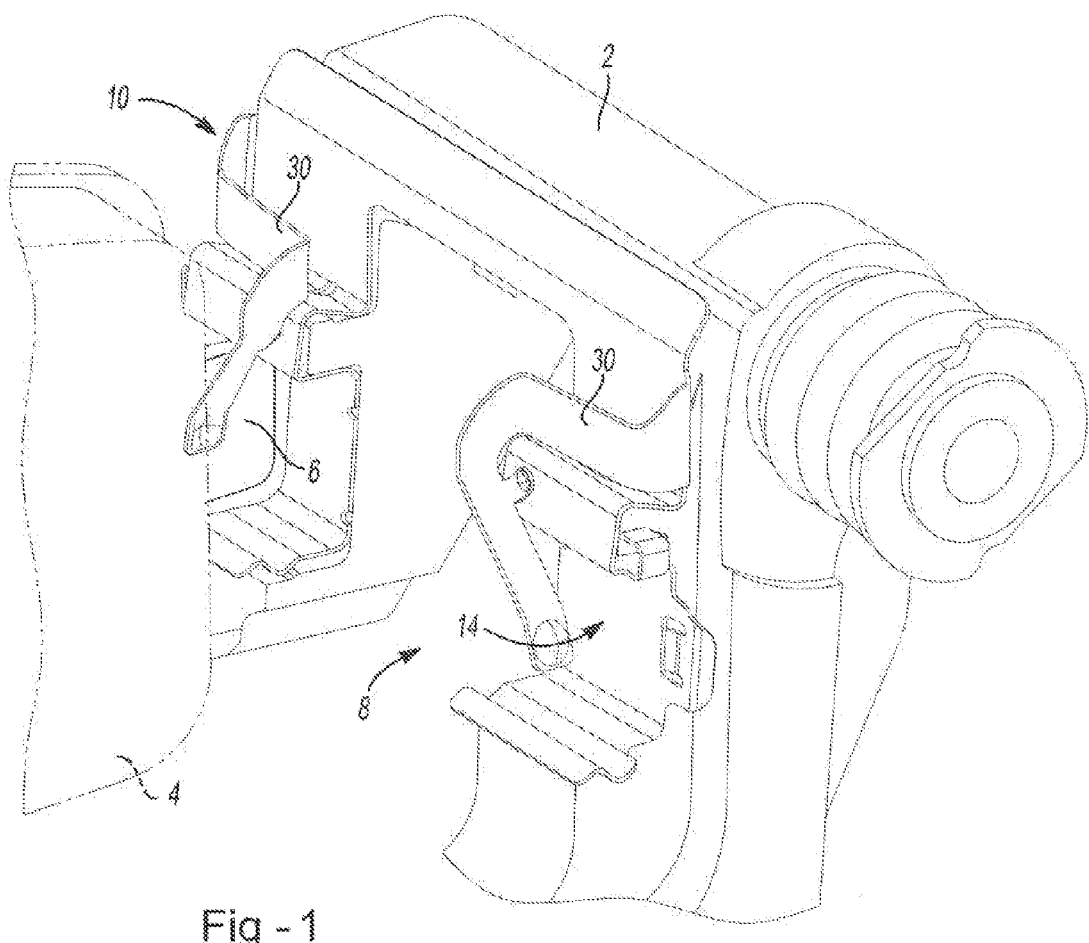
FIG. 1 illustrates one embodiment of the present invention in one possible brake assembly.

The following description of the preferred embodiment(s) is merely exemplary in nature and is in no way intended to limit the invention, its application, or uses.

The present invention is predicated upon providing an improved brake assembly for use with vehicles. For example, the brake assembly may be used with almost any vehicle (e.g. car, truck, bus, train, airplane, or the like). Alternatively, the brake assembly may be integrated into components used for manufacturing or other equipment that require a brake such as a lathe, winder for paper products or cloth, amusement park rides, or the like. However, the present invention is most suitable for use with a passenger vehicle (i.e. a car, truck, sports utility vehicle, or the like).

Generally, a brake assembly includes a caliper body, a rotor, and two brake pads. The caliper body is in communication with an inboard brake pad and an outboard brake pad that are on opposing sides of the rotor. The brake pads may be held in communication with a support bracket of the caliper body by a pad clip. Preferably, when pad clips are used one pad clip is used at each end of the brake pads so that the brake pads are maintained in communication with the support bracket. The present invention includes integral springs (i.e. pad retraction arms and guide support tabs) that are used in conjunction with the pad clip so that the springs will assist the brake pads in retracting after a brake apply.

The pad clip is comprised of a pair of opposing legs, a bridge between and connecting the opposing legs, a pair of retraction spring arms, and a guide support tab attached to each retraction spring arm. The pad clip may be made of separate pieces. Preferably, the pad clip is one unitary piece. The opposing legs may be of any shape and size that allow for connection of a retraction spring arm and/or a guide support tab so that the retraction spring arm and/or guide support tab may be retracted. The opposing legs may be separated by a rotor gap (i.e. a gap that the rotor rotates through). Preferably, the legs including the retraction spring arm and guide support tabs are reverse mirror images of each other. The legs may include protrusions for holding the pad clip on the support bracket. The legs may include one or more features (i.e. a recess) to hold an ear of a brake pad so that the face of the brake pad is maintained substantially parallel to the rotor. The braking system may include a stack path at the recess of the pad clip. For example, the stack path may be the distance at the recess between the face of the support bracket (i.e., the portion of the support bracket behind the pad clip) and an ear of the brake pad (i.e. the portion of the brake pad closest to the respective pad clip at the recess). The stack path may change. For example, the stack path may be smaller during a brake wear then when the brake pad is fully retracted. The thickness of the pad clip may affect stack path. For example, a pad clip that has more than one piece of material between the support bracket and the brake pad will have a larger stack path than a pad clip of equal material thickness that only has one piece of material between the support bracket and the brake pad.

The legs may include one or more features (i.e. a locator) that hold the outside of the support bracket so that the pad clip is free of movement during a brake apply, a brake retraction, during brake wear, or a combination thereof. The legs may form one or more planes. The legs may form a primary plane (i.e. a plane that includes a majority of the leg). The legs may form a secondary plane (i.e. a plane that includes a small portion of the leg). A secondary plane may be formed by a protrusion. Preferably, the protrusion forms the secondary plane and the secondary plane is generally parallel to the primary plane.

The bridge may be of any shape and size that allows the bridge to connect a first leg and a second leg together. The bridge may have a thickness and/or height that provides stiffness so that the pad clip does not twist and/or move during a brake apply, a brake retraction, during brake wear, or a combination thereof. The height of the bridge may be high enough so that a brake rotor may pass under the bridge and through a gap so that the rotor is free of contact with the bridge.

The gap may be any size so that a rotor may pass under the bridge without contacting the legs, the bridge, or both. The size of the gap may not be so great that the brakes have a soft feel. The gap, preferably, is free of any pad clip parts. More preferably, the gap is free of retraction arms. Most preferably, the gap is free of retraction arms and locators.

The pair of retraction spring arms may be of any shape and size so that the retraction spring arms assist in retracting the brake pads. Preferably, the pair of retraction spring arms are reverse mirror images of each other. The retraction spring arms may include one or more arcuate portions. The one or more arcuate portions may curve parallel to the legs, curve perpendicular to the legs, or an angle therebetween. The retraction spring arms may include one or more connection portions (i.e. an arcuate portion). The connection portions may be any portion that is connected to at least one other portion of the retraction spring arm. The connection portions may be of any length and size that allows the connection portions to assist in retracting the brake pads.

The retraction spring arms may include a connection limb. The connection limb is any limb that attaches the retraction spring arm to the outside of a leg. For example, the connection limb is connected on a side of a leg opposite a rotor gap (e.g., free of attachment in the rotor gap). The connection limb may be in the same plane as all or a portion of a leg. Preferably, the connection limb attaches to a side of a leg and extends outside of a primary plane of the leg (i.e. the plane in which a majority of the leg is located). More preferably, the connection limb is generally perpendicular to all or a portion of a leg. The connection limb may have a height. The height of the connection limb is the dimension of the connection limb that is connected to a leg, an adjoining limb, an arcuate portion, or a combination thereof of the pad clip (i.e. measuring the dimension of a limb where the limb attaches to another part of the pad clip). The connection limb may have a uniform height (i.e. the dimension of one end of the connection limb is equal to the dimension of the other end of the connection limb). Preferably, the connection limb tapers as the connection limb extends away from the leg. For example, the connection limb may be larger where the connection limb attaches to the leg than where the connection limb attaches to the pull-back curve. The height at the point where the connection limb attaches to the leg may be about 0.5 cm or more, about 0.7 cm or more, or about 0.9 cm or more. The height at the point where the connection limb attaches to the leg may be about 2.0 cm or less, about 1.5 cm or less, or about 1.2 cm or less. The height at the point where the connection limb attaches to the pull-back curve may be about 0.2 cm or more, about 0.4 cm or more, or about 0.6 cm or more. The height at the point where the connection limb attaches to the pull-back curve may be about 1.2 cm or less, about 1.0 cm or less, or about 0.8 cm or less. The connection limb may generally planar. The height of the connection limb on either side of the connection limb may be between about 0.2 cm and about 1.0 cm. The connection limb may include one or more arcs. Preferably, an arc of the connection limb is a small angle. For example, an arc of the connection limb may have an angle of about 10 degrees or less, about 5 degrees or less, about 3 degrees or less, or even about 1 degree. An arc of the connection limb may have an angle between about 5 degrees and about 3 degrees. The connection limb may connect to a leg on one side and a pull-back curve on the other end.

The pull-back curve may be any angle so that the retraction spring arm curves and assists in retracting a brake pad. The pull-back curve may include an angle. The angle of the pull-back curve may be any angle that allows the retraction spring arm to function as a retraction spring. The angle of the pull-back curve may be any angle between two generally straight portions. The angle of the pull-back curve may be any angle between two limb portions. For example, the angle of the pull-back curve may be measured by measuring the angle between the connection limb and the pull-back limb. The angle of the pull-back curve, at rest, may be an angle of about 135 degrees or less, about 115 degrees or less, about 105 degrees or less, or preferably about 95 degrees or less. The angle of the pull-back curve, at rest, may be an angle of about 30 degrees or more, about 45 degrees or more, about 60 degrees or more, about 75 degrees or more, or preferably about 85 degrees or more. The angle of the pull-back curve, at rest, may be substantially a right angle. The pull-back curve, at rest, may form an angle between, about 45 degrees and about 115 degrees, preferably between about 80 degrees and about 100 degrees. The angle of the pull-back curve may remain constant during a brake apply, a brake retract, brake wear, or a combination thereof. The angle of the pull back curve may vary during a brake apply, a brake retract, brake wear, or a combination thereof. The angle, during use, of the pull-back curve may vary by an angle of about 10 degrees or less, about 7 degrees or less, or about 5 degrees or less. The angle, during use, of the pull-back curve may vary by an angle of about 1 degree or more, about 2 degrees or more, or about 3 degrees or more. The angle of the pull-back curve may vary between about 8 degrees to about 4 degrees during use. The pull-back curve may bend during a brake apply, a brake retract, brake wear, or a combination thereof and resist the retraction spring arm from being pulled towards and/or into the rotor gap. The pull-back curve may bend during a brake apply, a brake retract, brake wear, or a combination thereof and store energy so that the retraction spring arm may not be pulled towards and/or into the rotor gap. Preferably, the shape of the pull-back curve stays substantially the same (i.e. the pull-back curve does not bend). Preferably, the pull-back curve may connect to the connection limb and turn at generally a right angle and connect to a pull-back limb that is generally parallel to the legs.

The pull-back limb may be any shape and size so that the retraction spring arm assists in retracting a brake pad. The pull-back limb may be attached to any other limb and/or curve discussed herein so that the pull-back limb assists the retraction spring arm in retracting a brake pad. The pull-back limb may have a length. The length of the pull-back limb may be a dimension measured from a region proximal to the rotor gap (i.e. arcuate curve) to a region proximal the outer edge of the leg (i.e. the pull-back curve). The pull-back limb may be of any length that assists is moving the retraction spring arm away from the rotor gap and/or so that the pull-back limb is not moved into the rotor gap. Preferably, the length of the pull-back limb may be less than the width of a leg (i.e. the distance from the rotor gap to an outside edge of a support bracket). The length of the pull-back limb may be about 5 cm or less, about 4 cm or less, preferably about 3 cm or less, or more preferably about 2.5 cm or less. The length of the pull-back limb may be about 0.5 cm or more, about 1.0 cm or more, preferably about 1.5 cm or more, or more preferably about 1.75 cm or more. The length of the pull-back limb may be about 1.5 cm to about 2.5 cm. The pull-back limb may work in conjunction with the pull-back curve so that the retraction spring arm may not be moved into the rotor gap and/or into any other parts. Preferably, the pull-back limb may be attached to the pull-back arc on one side and the arcuate curve on the opposite side.

The arcuate curve may be any angle so that the retraction spring arm curves and the arm assists in retracting a brake pad. The arcuate curve may include an angle. The angle of the arcuate curve may be any angle that allows the retraction spring arm to function as a retraction spring. The angle of the arcuate curve may be any angle between two generally straight portions. The angle of the arcuate curve may be any angle between two limb portions. For example, the angle of the arcuate curve may be measured by measuring the angle between the arcuate limb and the pull-back limb. The angle of the arcuate curve, at rest, may be an angle of about 135 degrees or less, about 115 degrees or less, about 105 degrees or less, or preferably about 95 degrees or less. The angle of the arcuate curve, at rest, may be an angle of about 30 degrees or more, about 45 degrees or more, about 60 degrees or more, about 75 degrees or more, or preferably about 85 degrees or more. The angle, at rest, of the arcuate curve may be substantially a right angle. The arcuate curve, at rest, may form an angle between about 30 degrees and about 105 degrees, preferably between about 80 degrees and about 100 degrees. The angle of the arcuate curve may remain constant during a brake apply, a brake retract, brake wear, or a combination thereof. The angle of the arcuate curve may vary during a brake apply, a brake retract, brake wear, or a combination thereof. The angle, during use, of the arcuate curve may vary by an angle of about 10 degrees or less, about 7 degrees or less, or about 5 degrees or less. The angle, during use, of the arcuate curve may vary by an angle of about 1 degree or more, about 2 degrees or more, or about 3 degrees or more. The angle of the arcuate curve may vary between about 8 degrees to about 4 degrees during use. The angle of the arcuate curve, during use, may remain substantially constant (i.e. change by 2 degrees or less). The arcuate curve may bend during a brake apply, a brake retract, brake wear, or a combination thereof and resist the retraction spring arm from being pulled towards and/or into the rotor gap. The arcuate curve may bend during a brake apply, a brake retract, brake wear, or a combination thereof and store energy so that the retraction spring arm may not be pulled towards and/or into the rotor gap. The arcuate curve may store energy so that when a brake apply is complete the arcuate curve releases its stored energy and assists in retracting a brake pad. Preferably, the arcuate curve may connect to the pull-back limb and turn at generally a right angle and connect to an arcuate limb.

The arcuate limb may be of any size and shape so that the retraction spring arms assist in retracting the brake pads. The arcuate limb may be a generally curved portion that is substantially perpendicular to the primary plane of the legs. The arcuate limb may create a pie shape. For example, the arcuate limb may include two curves (e.g. two radii). The arcuate limb may have a top radii of a first length and a bottom radii of a second length. The top radii may be larger than the bottom radii so that the arcuate limb may curve over and/or around a protrusion in the legs. The top radii may have a length. The top radii may be a straight line. Preferably, the top radii may be an arc of a circle (e.g., a portion of a circle's circumference). For example, the length of the top radii may be equal to a corresponding partial circumference of a circle. The top radii may be about 1.0 cm or longer, about 1.2 cm or longer, or about 1.5 cm or longer. The top radii may be about 3 cm or shorter, about 2 cm or shorter, or about 1.75 cm or shorter. The bottom radii may have a length. The bottom radii may be a straight line. Preferably, the bottom radii may be an arc of a circle (e.g., a portion of a circle's circumference). For example, the length of the bottom radii may be equal to a corresponding partial circumference of a circle. The bottom radii may be about 0.5 cm or longer, about 0.7 cm or longer, or about 1.0 cm or longer. The bottom radii may be about 2.0 cm or shorter, about 1.5 cm or shorter, or about 1.2 cm or shorter. The top radii and bottom radii may have a ratio. The ratio of top radii to bottom radii may be about 1.2:1 or greater, about 1.3:1 or greater, or about 1.4:1 or greater. The ratio of top radii to bottom radii may be about 2.2:1 or less, about 2.0:1 or less, or about 1.8:1 or less. The arcuate limb may be oriented so that an edge of the retraction spring arm is facing the leg (i.e. the material thickness of the arm faces the leg or the smallest dimension or the arm faces the leg). The arcuate limb may bend during a brake apply, a brake retract, brake wear, or a combination thereof and resist the retraction spring arm from being pulled towards and/or into the rotor gap. The arcuate limb may bend during a brake apply, a brake retract, brake wear, or a combination thereof and store energy so that the retraction spring arm may not be pulled towards and/or into the rotor gap. The arcuate limb may store energy so that when a brake apply is complete the arcuate limb releases its stored energy and assists in retracting a brake pad. The shape of the arcuate limb may change. For example, the arcuate limb at rest may be substantially straight and during a brake apply, brake wear, or both the shape of the arcuate limb may change. The arcuate limb's shape may change during a brake apply, brake wear, or both by about 0.5 degrees or more, about 1.0 degrees or more, or about 1.5 degrees or more. The arcuate limb's shape may change a brake apply, brake wear, or both by about 5.0 degrees or less, about 4.0 degrees or less, or about 3.0 degrees or less. The arcuate limb may curve so that the arcuate limb is connected to the pull-back limb via an arcuate curve on one side and a retraction curve on the opposite side.

The retraction curve may be of any size, shape, angle, or a combination thereof that assists the retraction spring arm in retracting the brake pads. The retraction curve may be any angle that allows the retraction spring arm to curve so that the retraction spring arm assists in retracting a brake pad. The retraction curve may include an angle. The angle of the retraction curve may be any angle that allows the retraction spring arm to function as a retraction spring. The angle of the retraction curve may be any angle between two generally straight portions. The angle of the retraction curve may be any angle between two limb portions. For example, the angle of the retraction curve may be measured by measuring the angle between the arcuate limb and the retraction limb. The angle of the retraction curve may be an angle, at rest, of about 160 degrees or less, about 145 degrees or less, about 135 degrees or less, or preferably about 115 degrees or less. The angle of the retraction curve, at rest, may be an angle of about 60 degrees or more, about 75 degrees or more, about 90 degrees or more, about 95 degrees or more, or preferably about 105 degrees or more. The angle of the retraction curve may be substantially a right angle. The retraction curve may form an angle, at rest, between about 150 degrees and about 90 degrees, and preferably between about 135 and about 105 degrees. The angle of the retraction curve may remain constant during a brake apply, a brake retract, brake wear, or a combination thereof. The angle of the retraction curve may vary during a brake apply, a brake retract, brake wear, or a combination thereof. The angle, during use, of the retraction curve may vary by an angle of about 30 degrees or less, about 20 degrees or less, or about 15 degrees or less. The angle, during use, of the retraction curve may vary by an angle of about 5 degree or more, about 10 degrees or more, or about 12 degrees or more. The angle of the retraction curve may vary between about 10 degrees to about 25 degrees during use. The angle of the retraction curve, during use, may remain substantially constant (i.e. change by 2 degrees or less). The retraction curve may bend during a brake apply, a brake retract, brake wear, or a combination thereof and resist the retraction spring arm from being pulled towards and/or into the rotor gap. The retraction curve may bend during a brake apply, a brake retract, brake wear, or a combination thereof and store energy so that the retraction spring arm may not be pulled towards and/or into the rotor gap. The retraction curve may store energy so that when a brake apply is complete the retraction curve releases its stored energy and assists in retracting a brake pad. Preferably, the retraction curve may connect to the arcuate limb and turn and connect to a retraction limb.

The arcuate curve, the arcuate limb, the retraction curve, or a combination thereof may move as one piece during a brake apply, a brake retract, brake wear or a combination thereof. For example, when the brakes are applied and the brake pads begin to move all of these pieces bend so that energy is stored between the arcuate curve, the arcuate limb, the retraction curve, or a combination thereof. Preferably, a majority of the flexing of the retraction spring arm occurs at the arcuate curve, the arcuate limb, the retraction curve, or a combination thereof. More preferably, a majority of the energy is stored between the arcuate curve, the arcuate limb, the retraction curve, or a combination thereof.

The retraction limb may be of any size and shape so that the retraction spring arms assist in retracting the brake pads. The retraction limb may have a length, a width, and a height (e.g. thickness). The length of the retraction limb may be any length so that the retraction limb may assist in retracting the brake pads. The retraction limb may have a length of about 6 cm or less, about 5 cm or less, preferably about 4 cm or less, or more preferably about 3.5 cm or less. The length of the retraction limb is between about 1.0 cm or more, about 1.5 cm or more, preferably about 2.0 cm or more, or more preferably about 2.5 cm or more. The length of the retraction limb may be about 1.8 cm to about 2.6 cm. The retraction spring arm may have a ratio of the length of the pull-back limb to the length of the retraction limb. The ratio of the length of the pull-back limb to the length of the retraction limb may be any length so that the retraction spring arm assists in retracting a brake pad without the retraction spring arm being moved into the rotor gap, into contact with the rotor, into contact with other components, or a combination thereof. The ratio of the retraction limb to the pull-back limb may be about 1.1:1 or greater, about 1.2:1 or greater, or about 1.5:1 or greater. The ratio of the retraction limb to the pull-back limb may be about 3:1 or less, about 2.5:1 or less, or about 2.0:1 or less. The ratio of the retraction limb to the pull-back limb may be between about 1:1.5 to about 1.5:1. The width of the retraction limb may be the second largest dimension of the of the retraction limb. The width of the retraction limb may face a leg. Preferably, the width of the retraction limb may be perpendicular to a leg (i.e. the height faces the leg). The retraction limb may bend during a brake apply, a brake retract, brake wear, or a combination thereof. Preferably, the retraction limb remains substantially straight (i.e. does not bend) during a brake apply, a brake retract, brake wear, or a combination thereof. More preferably, the energy stored in the arcuate curve, the arcuate limb, the retraction curve, or a combination thereof moves the retraction limb after a brake apply so that the retraction limb assists in retracting a brake pad. The retraction limb may connect to the retraction curve at one end and a distal end curve at the opposite end. The retraction limb may include a guide support tab.

The guide support tab may be of any size, shape, or configuration so that the guide support tab guides the retraction spring arm and the retraction spring arm assists in retracting a brake pad. The guide support tab may have an orientation relative to the retraction limb. The orientation of the guide support tab may be any orientation that assists the retraction spring arm in retracting a brake pad. The orientation of the guide support tab may be an angle relative to the retraction limb. The angle between the guide support tab and the retraction limb may be about 30 degrees or greater, about 45 degrees or greater, about 60 degrees or greater, or preferably about 75 degrees or greater. The angle between the guide support tab and the retraction limb may be about 150 degrees or less, about 135 degrees or less, about 115 degrees or less, or preferably about 105 degrees or less. Most preferably, the guide support tab is perpendicular to the retraction limb and parallel to a leg.

The guide support tab may contact any portion of a leg so that the retraction spring arm assists in retracting a brake pad. The guide support tab may contact a portion on the primary plane of a leg. Preferably, the guide support tab may contact a portion on the secondary plane (i.e. the protrusion). More preferably, the guide support tab will be moved into contact with the protrusion, and the guide support tab will prevent the retraction spring arm from rotating so that the retraction spring arm assists in retracting the brake pads. The guide support tab may assist in maintaining the retraction spring arm adjacent to the first plane, the second plane, or both. The guide support tab may prevent the retraction limb for moving out of contact with the brake pad. The guide support tab may assist in keeping the retraction limb in a substantially constant contact with a brake pad (i.e. the retraction limb does not change orientation so that an edge comes into contact with a brake pad). The guide support tab may remain static during a brake apply, a brake retraction, brake wear, or a combination thereof. Preferably, the guide support tab may move along the protrusion during a brake apply, a brake retract, brake wear, or a combination thereof. There may be a gap between the guide support tab and the protrusion when the brakes are not being used (i.e. the brakes are at rest). The guide support tab and the protrusion may be in constant contact. The guide support tab may prevent the retraction spring arm from rotating as the retraction spring arm moves. The guide support tab may move into contact with the protrusion during a brake apply, a brake retract, brake wear, or a combination thereof so that the retraction spring arm does not move relative to a primary plane, a second plane, or both (i.e. towards or away from the leg). The guide support tab may include one or more positioning features. The one or more positioning features may be of any shape and size so that the guide support tab maintains constant contact with the protrusion regardless of the orientation of the guide support tab to the protrusion. For example, if the guide support tab is not completely parallel to the protrusion (i.e. a face of the guide support tab is rotated by an angle) the amount of area of the positioning feature will remain constant so that performance of the guide support tab is not sacrificed. The positioning feature may be a dimple. The dimple may be any shape so that the one point of the guide support tab is in contact with the protrusion. The dimple may be triangular shaped, a pyramid shape, dome shaped, or the like. Preferably, the dimple is a half circle so that the dimple protrudes from the face of the guide support tab and contacts the protrusion.

The distal end curve may be of any size, shape, angle, or a combination thereof so that the retraction spring arm assists in retracting the brake pads. The distal end curve may be any angle that allows the retraction spring arm to curve so that arm assists in retracting a brake pad. The distal end curve may include an angle. The angle of the distal end curve may be any angle that allows the retraction spring arm to function as a retraction spring. The angle of the distal end curve may be any angle between two generally straight portions. The angle of the distal end curve may be any angle between two limb portions. For example, the angle of the distal end curve may be measured by measuring the angle between the distal end limb and the retraction limb. The angle of the distal end curve may be an angle, at rest, of about 180 degrees or less, about 175 degrees or less, about 170 degrees or less, or preferably about 165 degrees or less. The angle of the distal end curve, at rest, may be an angle of about 70 degrees or more, about 85 degrees or more, about 95 degrees or more, about 105 degrees or more, or preferably about 115 degrees or more. The angle of the distal end curve may be substantially a right angle. The distal end curve may form an angle, at rest, between about 175 degrees and about 90 degrees, and preferably between about 150 and about 105 degrees. The angle of the distal end curve may remain constant during a brake apply, a brake retract, brake wear, or a combination thereof. The angle of the distal end curve may vary during a brake apply, a brake retract, brake wear, or a combination thereof. The angle, during use, of the distal end curve may vary by an angle of about 10 degrees or less, about 7 degrees or less, or about 5 degrees or less. The angle, during use, of the distal end curve may vary by an angle of about 1 degree or more, about 2 degrees or more, or about 3 degrees or more. The angle of the distal end curve may vary between about 0.5 degrees to about 5 degrees during use. Preferably, the angle of the distal end curve, during use may remain substantially constant (i.e. change by 2 degrees or less). Preferably, the distal end curve may connect to the retraction limb and turn and connect to a distal end limb.

The distal end limb may be of any size and shape so that the retraction spring arms assist in retracting the brake pads. The distal end limb may have a length, a width, and a height. The length of the distal end limb may be any length so that the distal end limb may assist in retracting the brake pads. The distal end limb may have is length of about 1 cm or less, about 0.8 cm or less, preferably about 0.6 cm or less, or more preferably about 0.5 cm or less. The length of the distal end limb may be about 0.1 cm or more, about 0.2 cm or more, preferably about 0.3 cm or more, or more preferably about 0.4 cm or more. The length of the distal end limb may be about 1.5 cm to about 0.75 cm. The retraction spring arm may have a ratio of the length of the pull-back limb to the length of the retraction limb and the distal end limb. The ratio of the length of the pull-back limb to the length of the retraction limb and the distal end limb may be any length so that the retraction spring arm assists in retracting a brake pad without the retraction spring arm being moved into the rotor gap, into contact with the rotor, into contact with other components, or a combination thereof. The ratio of the retraction limb to the pull-back limb and the distal end limb may be about 1.1:1:0.25 or greater, about 1.2:1:0.25 or greater, or about 1.5:1:0.25 or greater. The ratio of the retraction limb to the pull-back limb and the distal end limb may be about 3:1:0.25 or less, about 2.5:1:0.25 or less, or about 2.0:1:0.25 or less. The ratio of the distal end limb to the pull-back limb may be between about 1:1 to about 1:5. The ratio of the distal end limb to the retraction limb may be between about 1:2 to about 1:6. The length of the distal end limb may be the largest dimension. The width of the distal end limb may be the second largest dimension of the distal end limb. The length and width of the distal end limb may be substantially equal. The width of the distal end limb may face a leg. Preferably, the width of the distal end limb may be perpendicular to a leg. The distal end limb may connect to the distal end curve at one end and terminate at the opposite end. The distal end limb may include one or more positioning features. The one or more positioning features may be of any shape and size so that the distal end limb maintains constant contact with a brake pad. For example, the distal end limb may maintain constant contact with a brake pad if the distal end limb is not completely parallel to the brake pad (i.e. a face of the distal end limb is rotated by an angle). The positioning feature may be a dimple. The dimple may be any shape so that the one point of the distal end limb is in contact with the brake pad regardless of the orientation of the distal end limb to the brake pad. The dimple may be triangular shaped, a pyramid shape, dome shaped, or the like. Preferably, the dimple is a hail circle so that the dimple protrudes from the face of the distal end limb and contacts the brake pad.

Each leg may include one or more locators. The locators may be situated anywhere on the legs so that the one or more locators hold the pad retraction device in place. The locators may be any shape so that the pad retraction device is maintained substantially static relative to the support bracket. The locator may be located juxtaposed to the projection on each leg. The locator may be square in shape. The locator may generally form a "Q" shape. The locator may include one or more bends. Preferably, the locator may include at least two bends. More preferably, the locator includes three bends. The bends of the locator may curve so that a distal end of the locator faces another portion of the locator. The locator may be a unitary piece and may be an integral part of the pad retraction device, a leg, of both. The locator may be free of any removed portions. The locator may not have any pieces stamped out, cut out, ground off, drilled, or a combination thereof. Preferably, the locator may be formed of one piece and folded back upon itself to create a locator.

The present invention may include one or more of the limbs, curves, tabs, positioning features, or a combination thereof described herein. For example, it is contemplated that a retraction spring arm may include a connection limb attached to a retraction limb via an arcuate curve. The limbs, curves, tabs, positioning features, or a combination thereof may be positioned in any order relative to each other. Preferably, however, the limbs, curves, tabs, and positioning features, or a combination thereof are positioned in the order described herein.

The retraction spring arms may exert a force axially, in relationship to rotor, in the retract direction. The retraction spring arms may apply any amount of force that assists the brake pads in moving axially, relative to the rotor, after a brake apply. Each retraction spring arm of the pad clip may assert a different force on each of the respective brake pads. Preferably, the retraction spring arms may exert substantially the same force on each of the respective brake pads. The retraction spring arms may each exert an axial force in the retract direction of about 5 N or more, about 10 N or more, preferably about 15 N or more, or more preferably about 20 N or more. The one or more arms may each exert an axial force in the retract direction of about 45 N or less, preferably about 40 N or less, or more preferably about 35 N or less. Preferably, each retraction spring arm will exert a force of between about 10 N to about 25 N. Preferably, two pad clips are used (i.e. one on each side of the brake pads). More preferably, both pad clip retraction spring arms may exert an axial force in the retract direction on one brake pad. For example, one retraction spring arm may exert a force of about 20 N and two retraction spring arms may exert a force of about 40 N on each brake pad. Two retraction spring arms may exert a force of about 10 N or more, about 20 N or more, about 30 N or more, about 40 N or more, about 50 N or more, or even about 60 N or more. Two retraction spring arms may exert a force of about 100 N or less, about 90 N or less, about 80 N or less, or about 70 N or less. Preferably, the brake may include an inboard brake pad and an outboard brake pad and the retraction spring arms will apply substantially the same amount of force to both brake pads in the retract direction.

The pad clip and retraction spring arms may be made of any material that may be formed and may exert a force when compressed. The pad clip and retraction spring arms may be made of and/or include polymeric materials. The pad clip and retraction spring arms may be made of plastic. The pad clip and retraction spring arms may be made of multiple materials. The pad clip and retraction spring arms may be made of different materials. For example, a portion of the pad clip may be metal and the retraction spring arms may be a polymeric material such as rubber. Preferably, the pad clip and retraction spring arms may be made of the same material. More preferably, the pad clip and retraction spring arms may be made of metal. The pad clip and retraction spring arms may be any metal that exhibits good plastic deformation and good elastic deformation characteristics. More preferably, the pad clip and retraction spring arms may be made of stainless steel. Most preferably, the pad clip and the retraction spring arms are formed from one unitary piece of stainless steel sheet metal so that the pad clip is one unitary piece. The pad clip and retraction spring arms may be made of a wire, a sheet, a band, tube, pipe, or the like. Preferably, the pad clip and retraction spring arms are made of a sheet of metal. More preferably, the pad clip and the retraction spring arms are made of a stamped and formed sheet of metal. Most preferably, the pad claim may be made of 301¾ hard stainless steel measured using ASTM A666. The material may be any gauge (i.e. thickness) so that retraction spring arms assist in moving the brake pads in the retract direction. The material may be any size that allows the pad clip and retraction spring arms to exert a desired force. The material may be any size (e.g. thickness, diameter, gauge, length, width, or the like) that allows the pad clip and retraction spring arms to assist in pad retraction. The sheet may be about 0 gauge or larger, about 3 gauge or larger, about 5 gauge or larger, or about 10 gauge or larger. The sheet may be about 30 gauge or smaller, about 25 gauge or smaller, or about 20 gauge or smaller (e.g., between about 22 gauge and about 12 gauge (i.e., about 18 gauge when measured using the steel gauge scale)). The thickness of the material may vary across the pad clip. Preferably, the thickness of the material is substantially uniform across the entire pad clip.

The pad clip and retraction spring arms may deform as the brake pads wear. The deformation may be elastic deformation. For example, the shape of the retraction spring arms do not permanently change as the brake pads wear, but the retraction spring arms elastically deform so that the retraction spring arms remains between the two brake pads, and assists in returning the brake pad substantially back to their pre-brake position so that a constant air gap is maintained. Air gap may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. The air gap may be any size that allows for braking. The air gap may be of any size that does not cause the brake pedal to have a soft feel or a long travel. Preferably, the air gap will be small (e.g. between about 0.05 mm to about 0.2 mm). The deformation may be plastic deformation. For example, as the brake pads wear the retraction spring arms will change shape so that the distance between the two arms becomes smaller. Preferably, any plastic deformation to the retraction spring arms occurs so that the retraction spring arms remain outside of the rotor gap. The amount of deformation may vary from as the brake pad wears. For example, the retraction spring arms will be substantially free of deformation when the brake pads are new and will be at their maximum deformation when the brake pads are fully worn so that the amount of force applied to the brake pad is maintained substantially constant. In another example, as the retraction spring arms plastically deform the force exerted against each brake pad will remain substantially constant.

FIG. 1 illustrates a perspective view of a support bracket 2 including a pad clip 10 and a brake pad 4. An ear 6 of the brake pad 4 is held in a recessed portion 14 of the pad clip 10. The pad clip includes a rotor gap 8 and a retraction spring arm 20. The retraction spring arm is in contact with the ear 6 of the brake pad 4.

Figure 2:
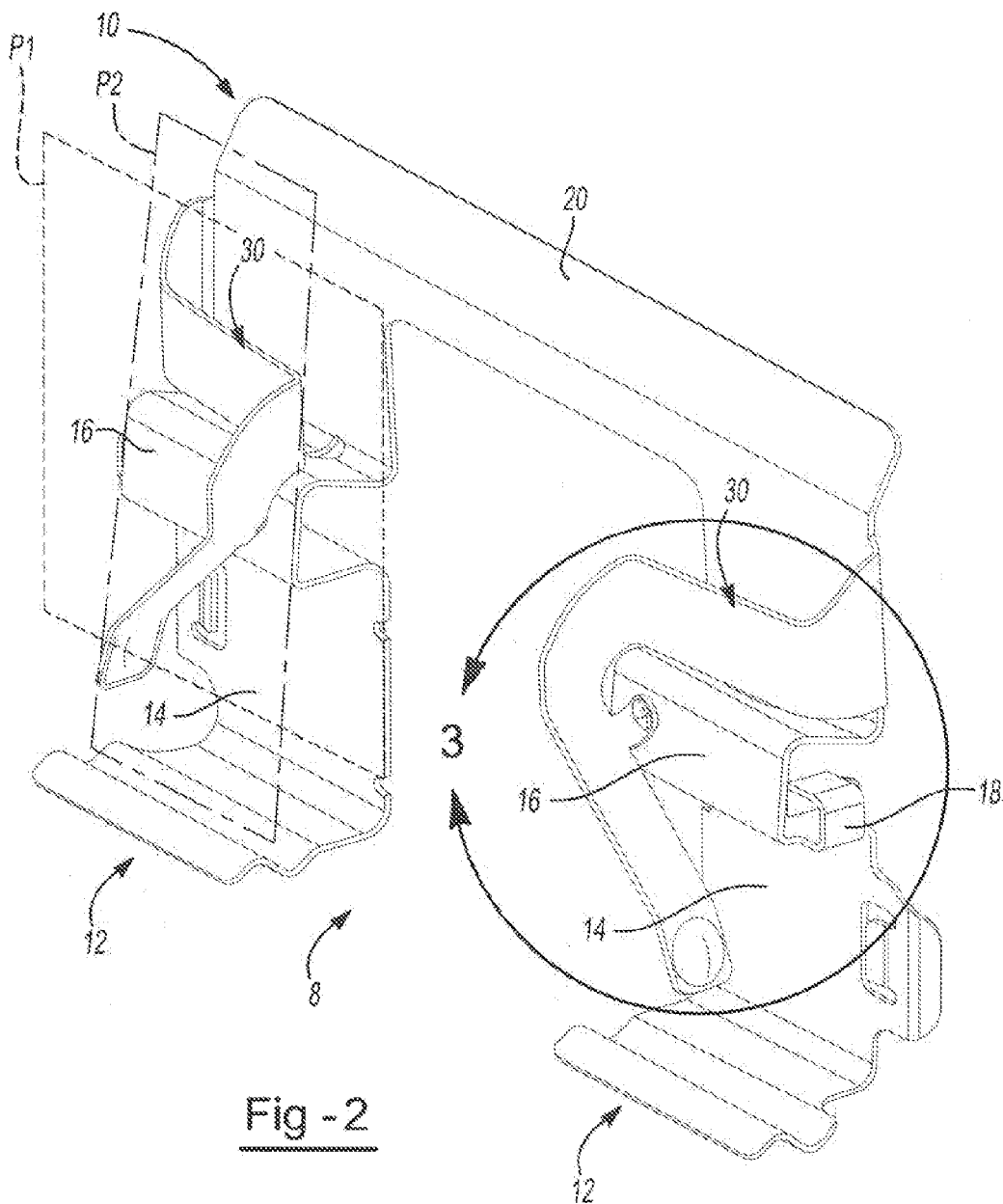
FIG. 2 illustrates a perspective view of the present invention.

FIG. 2 illustrates a perspective view of the pad clip 10 of FIG. 1. The pad clip includes a rotor gap 8, legs 12, and retraction spring arms 30. The legs include a recessed portion 14, a protrusion 16, and a locator 18. The legs are connected by a bridge 20 that extends over the rotor gap 8. A majority of the legs 12 form a first plane (P1) and the projection 16 of the legs forms a second plane (P2). The first plane (P1) and the second plane (P2) are generally parallel to each other.

Figure 3:
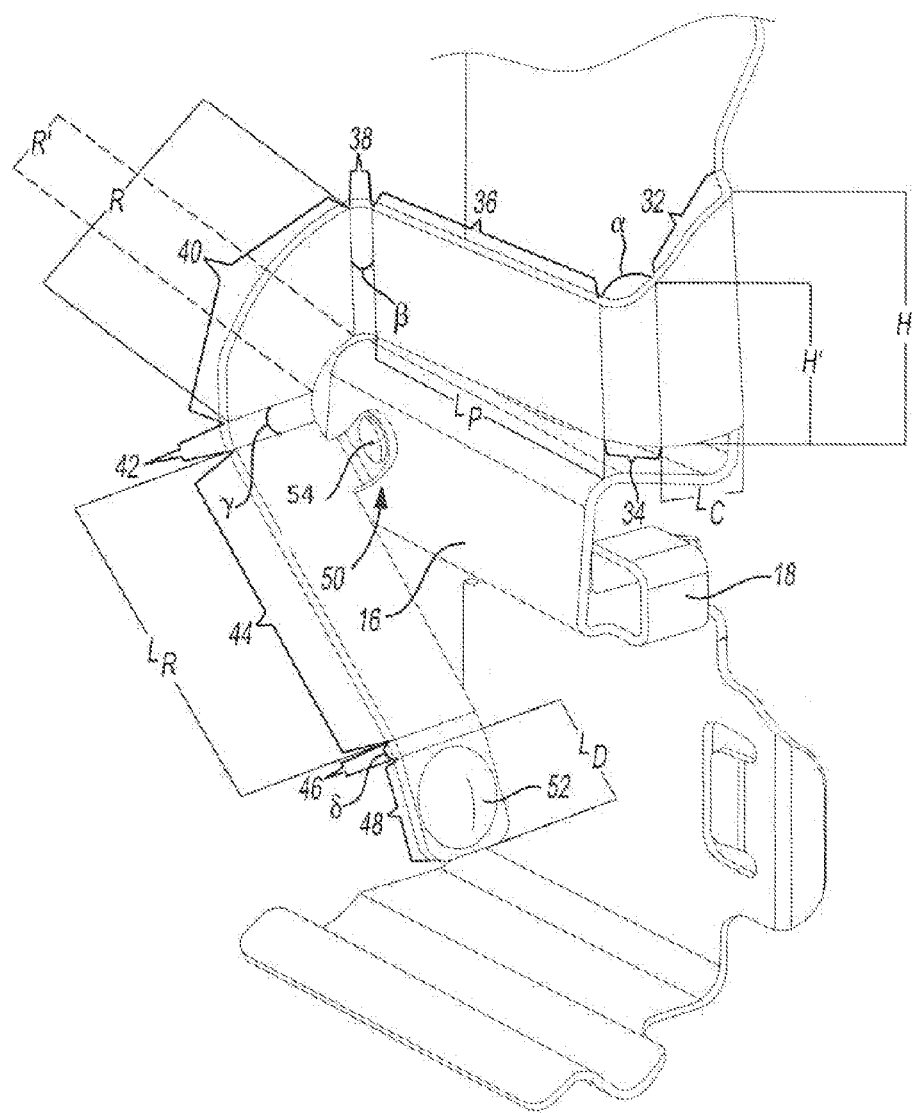
FIG. 3 illustrates a close up view of the retraction spring arm of FIG. 2.

FIG. 3 illustrates a close-up view of one retraction spring arm 22. FIG. 3 further includes lines in the retraction spring arm, for illustrative purposes only, to assist in illustrating each of the different components of the retraction spring arm. The retraction spring arm is comprised of: a connection limb 32 attached to the outside of a leg 12 of pad clip 10. The connection limb 32 is connected to a pull-back curve 34, and the pull back curve connects the connection limb 32 to a pull-back limb 36. The pull-back limb 36 is connected to an arcuate limb 38 and the arcuate curve 38 connects the pull-back limb 36 to an arcuate limb 40. The arcuate limb 40 is connected to the retraction limb curve 42, and the retraction curve 42 connects the arcuate limb 40 to a retraction limb 44. The retraction limb 44 is connected to a distal end curve 46, and the distal end curve connects the retraction limb 44 to a distal end limb 48. The distal end limb 48 includes a positioning feature 52. The positioning feature 52 contacts the brake pad as is illustrated in FIG. 1. The retraction limb 44 includes a guide support tab 50, and the guide support tab includes a positioning feature 54 that contacts the protrusion 16. The pull-back curve 34 includes an angle ($\alpha$). The arcuate curve 38 includes an angle ($\beta$). The retraction curve 42 includes an angle ($\gamma$). The distal end curve 46 includes an angle ($\delta$). The connection limb 32 has a height (H) were the connection limb attaches to the leg and has a different height (H') where the connection limb attaches to the pull-back curve 34. The connection limb 32 includes a length ($L_C$), the pull-back limb 36 includes a length ($L_P$), the retraction limb 44 includes a length ($L_R$), and the distal end limb 48 includes a length ($L_D$). The arcuate limb 40 includes a length or top radii (R) and another length or bottom radii (R').

Figure 4A:
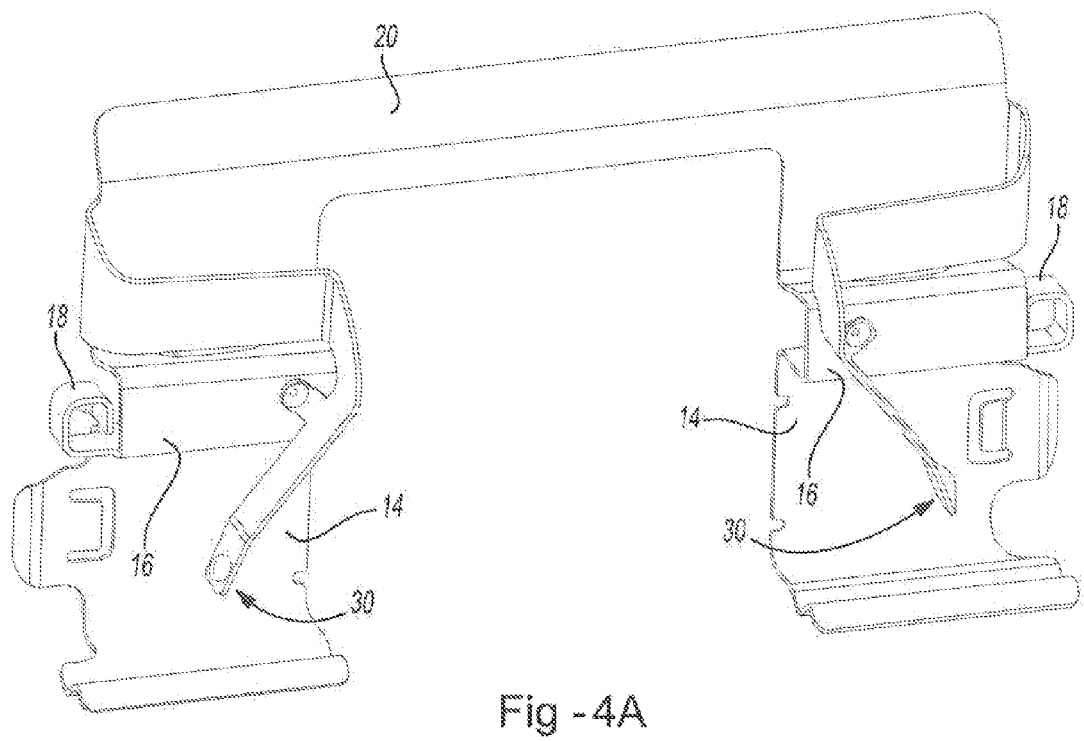
FIG. 4A illustrates a plan view of the present invention in the retract position.
Figure 4B:
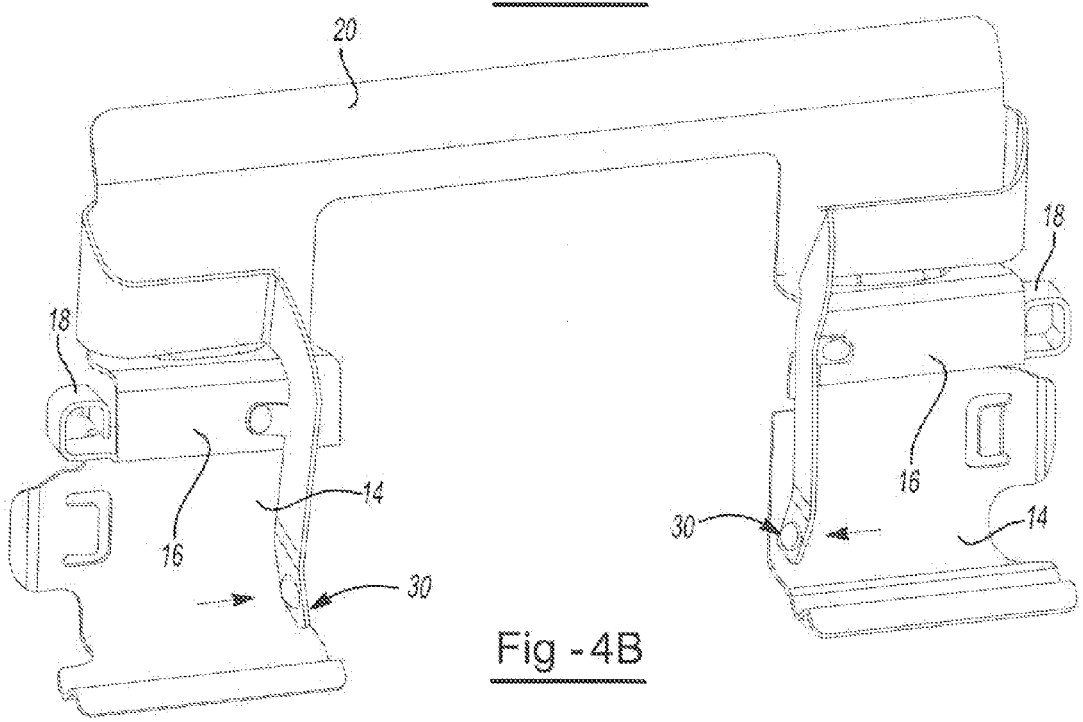
FIG. 4B illustrates a plan view of the present invention in the apply position.

FIG. 4A illustrates the retraction spring arm 30 at rest (i.e. after and/or before the brakes are applied). The arrows indicate the direction the arms move during a brake retract. FIG. 4B illustrates the retraction spring arm 30 during a brake apply, during brake wear, or both. The arrows indicate the direction the arms move during a brake apply.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 55, 22 to 65, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of"

to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A device comprising:
    a. a pair of opposing legs;
    b. a bridge between and connecting the pair of legs;
    c. a pair of retraction spring arms attached to the outside of each of the legs; the retraction spring arms each comprising:
        i. a guide support tab connected to each of the pair of retraction spring arms;
    wherein the retraction spring arms assist in retracting a pair of brake pads, and the guide support tabs guide the retraction spring arms during movement;
    wherein the guide support tab contacts a projection on the pair of opposing legs so that the arms do not rotate during brake wear, brake apply, brake retraction, or a combination thereof;
    wherein the guide support tabs each include a dimple so that the guide support tabs maintain contact with the projection on the pair of opposing legs regardless of orientation of the guide support tabs to the projection.

2. The device of claim 1, wherein the guide support tabs slide; along a portion of a face of a projection, on the pair of opposing legs, during brake wear, brake apply, brake retraction, or a combination thereof.

3. The device of claim 1, wherein the retraction spring arms each include a retraction limb, and the retraction limb remains straight during a brake apply.

4. The device of claim 3, wherein the retraction spring arms each include a connection limb and a pull-back limb that are connected by a pull-back curve, the pull-back curve being stiff so that the pullback curve creates a flexible resistance that allows for the respective retraction spring arm to be offset away from a rotor and a rotor gap.

5. The device of claim 3, wherein the retraction spring arms each include a pull-back limb and an arcuate limb are connected together by an arcuate curve, the arcuate curve being stiff enough so that the angle between the pull-back limb and the arcuate limb remain substantially the same as a force is applied to the retraction spring arm.

6. The device of claim 3, wherein the retraction spring arms each include an arcuate limb and a retraction limb that are connected by a retraction curve, the retraction curve changing angle during a brake apply so that a majority of the force applied during a brake apply is stored in the retraction curve, the arcuate limb, or both so that the stored energy will create a force in a retract direction when the brake apply is complete.

7. The device of claim 3, wherein the retraction spring arms each include a connection limb, a pull-back limb, and a pull-back curve, the pull-back curve forming an angle from about 45 degrees to about 115 degrees between the connection limb and the pull-back limb.

8. The device of claim 3, wherein the retraction spring arms each include a pull-back limb, an arcuate limb, and arcuate cure, the arcuate curve forming an angle from about 30 degrees to about 105 degrees between the pull-back limb and the arcuate limb.

9. The device of claim 3, wherein the retraction spring arms each include an arcuate limb, a retraction limb, and a retraction curve, the retraction curve forming an angle from about 105 degrees to about 135 degrees between the arcuate limb and the retraction limb.

10. A device comprising:
    a. a pair of opposing legs;
    b. a bridge between and connecting the pair of legs;
    c. a pair of retraction spring arms attached to the outside of each of the legs; the retraction spring arms each comprising:
        i. a guide support tab connected to each of the pair of retraction spring arms;
    wherein the retraction spring arms assist in retracting a pair of brake pads, and the guide support tabs guide the retraction spring arms during movement;
    wherein the guide support tab contacts a projection on the pair of opposing legs so that the arms do not rotate during brake wear, brake apply, brake retraction, or a combination thereof;
    wherein each of the retraction spring arms include a retraction limb and the guide support tabs are substantially perpendicular to the retraction limb of each of the retraction saps mg arms.

11. The device of claim 10, further including a locator on the outside of each of the pair of opposing legs, the locator being juxtaposed to the projection.

12. The device of claim 10, wherein each of the pair of opposing, legs include a locator and the locators are box shaped.

13. The device of claim 10, wherein the guide support tabs slide along: a portion of a face of the projection, on the pair of opposing legs, during brake wear, brake apply, brake retraction, or a combination thereof.

14. The device of claim 10, wherein the retraction spring arms each include a retraction limb, and the retraction limb remains straight during a brake apply.

15. A device comprising:
    a. a pair of opposing legs;
    b. a bridge between and connecting the pair of legs;
    c. a pair of retraction spring arms attached to the outside of each of the legs; the retraction spring arms each comprising:
        i. a guide support tab connected to each of the pair of retraction spring arms;

wherein the retraction spring arms assist in retracting a pair of brake pads, and the guide support tabs guide the retraction spring arms during movement;

wherein the pair of retraction spring arms are comprised of:
a) a connection limb, the connection limb extends away from and substantially perpendicular to each of the legs;
b) a pull-back limb connected to the connection limb;
the pull-back limb curves perpendicular to the connection limb towards the opposing leg and is substantially parallel to each of the legs without extending into a rotor gap located under the bridge;
c) an arcuate limb connected to the pull-back limb;
the arcuate limb being substantially perpendicular to the pull-back limb and the legs;
the arcuate limb curves out and away from the respective legs; and
the arcuate limb curves down and away from the pull-back limb;
d) a retraction limb on the side of the arcuate limb opposite the pull-back limb,
the retraction limb turning at an angle away from the rotor gap such that a small dimensional portion is facing respective leg; and
e) a distal end limb on a side of the retraction limb opposite the arcuate limb,
the distal end limb turning at an angle so that the a face of the distal end limb is substantially parallel to the rotor gap, a brake pad, or both.

16. The device of claim 15, wherein the guide support tab contacts a projection on the pair of opposing legs so that the arms do not rotate during brake wear, brake apply, brake retraction, or a combination thereof.

17. A device comprising:
a. a pair of opposing legs;
b. a bridge between and connecting the pair of legs;
c. a pair of retraction spring arms attached to the outside of each of the legs; the retraction spring arms each comprising:
i. a guide support tab connected to each of the pair of retraction spring arms;
wherein the retraction spring arms assist in retracting a pair of brake pads, and the guide support tabs guide the retraction spring arms during movement;
wherein the retraction spring arms each include a retraction limb that remains straight during a brake apply, and a distal end limb that are connected to the retraction limb by a distal end curve, the distal end curve forming an angle so that a face of the distal end limb is substantially parallel to a rotor gap, a face of a brake pad, or both.

18. The device of claim 17, wherein each of the pair of opposing legs include a locator and the locators extend away from the leg portion and curve backwards upon itself.

19. The device of claim 17, wherein the guide support tabs slide along: a portion of a face of a projection, on the pair of opposing legs, during brake wear, brake apply, brake retraction, or a combination thereof.

20. The device of 17, wherein the guide support to contacts a projection on the pair of opposing legs so that the arms do not rotate during brake wear, brake apply, brake retraction, or a combination thereof.

21. A device comprising:
a. a pair of opposing legs;
b. a bridge between and connecting the pair of legs;
c. a pair of retraction spring arms attached to the outside of each of the legs: the retraction spring arms each comprising:
i. a guide support to connected to each of the pair of retraction spring arms;
wherein the retraction spring arms assist in retracting a pair of brake pads, and the guide support tabs guide the retraction spring arms during movement:
wherein the retraction spring arms each include a retraction limb, and the retraction limb remains straight during a brake apply;
wherein the retraction spring arms each include a distal end limb and a distal end curve, the distal end curve forming an angle from about 105 degrees to about 150 degrees between the retraction limb and the distal end limb.

22. The device of claim 21, wherein the device is one unitary piece.

23. The device of claim 21, wherein the guide support tabs slide along a portion of a face of a projection, on the pair of opposing legs, during brake wear, brake apply, brake retraction, or a combination thereof.

24. The device of claim 21, wherein the guide support tab contacts a projection on the pair of opposing legs so that the arms do not rotate during brake wear, brake apply, brake retraction, or a combination thereof.

* * * * *

UNITED STATES PATENT AND TRADEMARK OFFICE
CERTIFICATE OF CORRECTION

PATENT NO. : 8,376,092 B2  
APPLICATION NO. : 13/024357  
DATED : February 19, 2013  
INVENTOR(S) : Brad Robert Lethorn Page 1 of 1

It is certified that error appears in the above-identified patent and that said Letters Patent is hereby corrected as shown below:

Title Page, U.S. Patent Documents, Column 1, "5,251,727 A" should read:
--5,351,727--.

In the Claims:

Column 16, line 46, "tion saps mg arms." should read:
--tion spring arms--.

Signed and Sealed this
Fourteenth Day of May, 2013

Teresa Stanek Rea
*Acting Director of the United States Patent and Trademark Office*